(12) United States Patent
Zhang et al.

(10) Patent No.: US 11,785,959 B2
(45) Date of Patent: Oct. 17, 2023

(54) FAST CHILLING METHOD FOR IMPROVING BEEF TENDERNESS

(71) Applicant: SHANDONG AGRICULTURAL UNIVERSITY, Taian (CN)

(72) Inventors: Yimin Zhang, Taian (CN); Xin Luo, Taian (CN); Yanwei Mao, Taian (CN); Rongrong Liang, Taian (CN); Pengcheng Dong, Taian (CN); Xiaoyin Yang, Taian (CN); Yunge Liu, Taian (CN); Xue Chen, Taian (CN)

(73) Assignee: SHANDONG AGRICULTURAL UNIVERSITY, Taian (CN)

( * ) Notice: Subject to any disclaimer, the term of this patent is extended or adjusted under 35 U.S.C. 154(b) by 0 days.

(21) Appl. No.: 18/121,058

(22) Filed: Mar. 14, 2023

(65) Prior Publication Data
US 2023/0292775 A1    Sep. 21, 2023

(30) Foreign Application Priority Data

Mar. 15, 2022 (CN) .......................... 202210250850.1

(51) Int. Cl.
*A23B 4/00* (2006.01)
*A23B 4/06* (2006.01)
(Continued)

(52) U.S. Cl.
CPC ............ *A23B 4/068* (2013.01); *A22B 5/0076* (2013.01); *A22C 17/004* (2013.01); *A23L 13/70* (2016.08); *F25D 17/02* (2013.01); *F25D 23/006* (2013.01)

(58) Field of Classification Search
CPC ........ A23B 4/068; F25D 17/02; F25D 23/006
(Continued)

(56) References Cited

U.S. PATENT DOCUMENTS 3,637,405 A * 1/1972 Mendelson ........... B65B 25/067
426/8
4,968,520 A * 11/1990 Wang ..................... A23B 4/066
426/524
(Continued)

FOREIGN PATENT DOCUMENTS

CN        101263836       9/2008
CN        103404582       11/2013
(Continued)

OTHER PUBLICATIONS

Sikes, "Very fast chilling modifies the structure of muscle fibres in hot-boned beef loin" Food Research International 93 (2017) 75-86.

*Primary Examiner* — Richard T Price, Jr.
(74) *Attorney, Agent, or Firm* — Kaplan Breyer Schwarz, LLP; Stuart H. Mayer

(57) ABSTRACT

Disclosed is a fast chilling method for improving beef tenderness, including the following steps: step 1, sample pretreatment: taking beef longissimus dorsi muscle after slaughter, removing surface fat and connective tissue, and vacuum packaging; step 2, rapid chilling: rapidly transferring the pre-treated sample completed in step 1 to a chilling equipment for chilling to a sample temperature of −3 degrees Celsius (° C.), where the chilling is completed within 5 hours (h) after slaughter; step 3, chilling and aging at super-chilled temperature: transferring the samples rapidly chilled in step 2 to a chilled warehouse, and continuing to chilling and aging until 24 h after slaughter; and step 4, chilling storage and aging: cutting the sample equally into 2.5 centimeters (cm) thickness 24 h after slaughter, and then completing a vacuum skin packaging and refrigerating for aging.

8 Claims, 12 Drawing Sheets

(51) Int. Cl.
 *A23L 13/70* (2023.01)
 *A22B 5/00* (2006.01)
 *F25D 23/00* (2006.01)
 *A22C 17/00* (2006.01)
 *F25D 17/02* (2006.01)
(58) Field of Classification Search
 USPC .......................................................... 452/141
 See application file for complete search history.

(56) References Cited

U.S. PATENT DOCUMENTS

| | | | | |
|---|---|---|---|---|
| 5,168,712 | A | * 12/1992 | Coelho | ............... A61M 1/0277 |
| | | | | 62/373 |
| 5,761,913 | A | * 6/1998 | Liberman | ............... F25D 17/02 |
| | | | | 62/345 |
| 2002/0139126 | A1 | * 10/2002 | Butler | ...................... A23B 4/08 |
| | | | | 62/304 |
| 2019/0008174 | A1 | * 1/2019 | Kang | ................. A22C 21/0061 |

FOREIGN PATENT DOCUMENTS

| | | |
|---|---|---|
| CN | 104041564 | 9/2014 |
| CN | 104719428 | 6/2015 |
| CN | 105767124 | 7/2016 |
| CN | 111280239 | 6/2020 |
| CN | 210718335 | 6/2020 |

\* cited by examiner

FAST CHILLING METHOD FOR IMPROVING BEEF TENDERNESS

CROSS-REFERENCE TO RELATED APPLICATIONS

This application claims priority to Chinese Patent Application No. 202210250850.1, filed on Mar. 15, 2022, the contents of which are hereby incorporated by reference.

TECHNICAL FIELD

The present application relates to the technical field of beef processing, and in particular to a fast chilling method for improving beef tenderness.

BACKGROUND

Beef carcasses are required to be chilled quickly after slaughter to ensure the quality and safety of the meat, where a pressing problem for beef producers is the evaporative weight loss caused by the relatively long chilling duration when adopting the widely used conventional chilling method (air chilling: 0-4 degrees Celsius (° C.), air speed 0.2-1.0 meter per second (m/s), air humidity 90 percent (%),-95%, 24 hours (h)-48 h), even though the cold shortening is effectively avoided. According to a conservative calculation, the economic loss caused by evaporative weight loss during carcass chilling is 17 times higher than the energy cost of chilling process (Brown et al, 2009). Therefore, it is important to develop an efficient chilling method that maintains or even improves the quality of meat, which will be beneficial to the sustainable development of the beef industry.

Fast chilling of beef carcasses after slaughter can significantly reduce chilling losses. Yet, too rapid chilling, such as rapid deep freezing, causes "thawing shrinkage" of the muscle, thus leading to deterioration of food quality. Cold shortening, a phenomenon of excessive muscle contraction, occurs if the pH is still above 6.2 when the muscle temperature is reduced to 12° C. and below, whereby the length of muscle segments can be shortened by more than 40%, resulting in excessive muscle toughening and very poor meat quality. In this regard, an innovative method of very-fast chilling, in which the carcass temperature is reduced to about 0° C. within 5 h after slaughter, has been used to avoid the occurrence of cold shortening due to the fixation of the physical structure of the surface. The method of very-fast chilling renovates the conventional guidelines of preventing the occurrence of muscle cold shortening with the potential advantages of reduced chilling duration, increased product turnout, and reduced evaporative losses. An inconsistency exists between this very-fast chilling method and the theory of pH-temperature-time window in the critical control point of food quality assurance, which is because very-fast chilling rapidly travels through the temperature interval where muscles are prone to cold shortening, resulting in no cold shortening of the muscles, in addition to improve the meat quality.

Despite extensive research conducted by scientists presently on the effects of very-fast chilling techniques on meat quality, the results of the effects on tenderness remain controversial. Some scholars treated semitendinosus muscle after hot boning with very-fast chilling (−20° C. to −25° C. (3 m/s)) to bring the central temperature to 0° C. at 5 h (pH 6.11-6.27) and observed that the length of myomere was significantly shorter than that of the conventional chilling group, but yet to reach the level of cold shortening, and the tenderness at 1 day (d), 4 d, and 11 d after slaughter was also significantly worse than that of the conventional chilling group (Van Moeseke et al, 2001); Pinto et al. (2013) chilled isolated longissimus dorsi muscles for 3.5 h using −20° C. (2 m/s) to bring the central temperature down to 0° C. (pH 6.16) at 2 h. The results showed that sarcomere length was shorter than that of the conventional chilling method, and the tenderness was not significantly different from that of the conventional chilling after 2 d of slaughter, while it was significantly worse than that of the conventional chilling group at 7 d and 14 d after slaughter. A recent study used a propylene glycol bath at −20° C. to chill isolated beef loin to a central temperature of −1.5° C. at 1.5 h after slaughter, and it was found that there was no significant difference in sarcomere length and no significant difference in tenderness at 2 d, 5 d, and 14 d of slaughter compared with that of the conventional chilling group (Sikes et al, 2017). In summary, very-fast chilling has become a promising chilling method for its short chilling duration and high output rate, but the industrial application is limited by its inconsistent effect on meat tenderness. Therefore, how to improve the very-fast chilling technology so as to ensure the improving performance on beef tenderness becomes a critical issue to be solved in the current beef cattle industry.

Accordingly, a fast chilling method for improving beef tenderness is urgently needed to solve the above problems.

SUMMARY

The present application provides a fast chilling method for improving beef tenderness, so as to solve the problems existing in the prior chilling scheme.

In order to achieve the above objectives, the present application provides the following technical scheme: a fast chilling method for improving beef tenderness, including steps as follows:

step 1, sample pretreatment: taking beef longissimus dorsi muscle immediately after slaughter, removing surface fat and connective tissue, and vacuum packaging;

step 2, rapid chilling: rapidly transferring the pre-treated sample completed in step 1 to a chilling equipment for chilling to a sample temperature of −3 degrees Celsius (° C.), where the chilling is completed within 5 hours (h) after slaughter;

step 3, chilling and aging at super-chilled temperature: transferring the samples rapidly chilled in step 2 to a chilled warehouse, and continuing to chilling and aging until 24 h after slaughter; and step 4, aging: cutting the sample equally into 2.5 centimeters (cm) thickness 24 h after slaughter, then completing a vacuum skin packaging and refrigerating for aging.

Optionally, the step 1 includes a hot boning process completed within 1.5 h after slaughter, where the sample after trimming should weigh less than 4.5 kilograms (kg).

Optionally, the chilled warehouse in step 3 is set according to parameters of: ambient temperature of −1+/−1° C., humidity of 90 percent (%)-92%, and air speed of 0.5 meter (m/s).

Optionally, the aging of step 4 includes parameters of: ambient temperature of 0-2° C., humidity of 90%-92%, and air speed of 0.5 m/s.

The chilling equipment includes: a chilling shell, where the chilling shell has propylene glycol solution provided inside, a thermal insulation mechanism provided on an outer wall of the chilling shell, a driving shell provided on a bottom surface of the chilling shell, a removable end cap provided on a top surface of the chilling shell, a driving mechanism provided on a bottom surface of the chilling shell, a clamping mechanism provided on a top surface of the driving mechanism, a number of stirring mechanisms provided at equal intervals in a circumferential direction of the chilling shell, a chilling mechanism provided on a bottom surface of an inner cavity of the driving shell, an extension rod fastened to a top surface of an inner cavity of the chilling shell, a temperature sensor is fastened to a bottom surface of the extension rod, and the temperature sensor is electrically connected to the chilling mechanism.

Optionally, the clamping mechanism includes a clamping plate, where the clamping plate is provided with a plurality of through holes on a top surface, each through hole is connected to a connecting cylinder on an inner wall of the through hole; a bottom surface of the connecting cylinders are fixedly connected with a plurality of limiting rods at equal intervals in a circumferential direction of the bottom surface, bottoms of the plurality of limiting rods are fixedly connected with a bottom plate, where a sampling ring is sleeved outside the bottom plate, an inner wall of the sampling ring is in sliding contact with outer walls of the limiting rods, and an inner wall of a top of the sampling ring is fixedly connected with a plurality of connecting rods; one end of each connecting rod passes through a gap between two adjacent limiting rods and is fixedly connected with a sampling plate; a bottom surface of the clamping plate is fixedly connected with a rotating column, and a bottom surface of the rotating column is fixedly connected with the top surface of the driving mechanism.

Optionally, the driving mechanism includes a driving plate, a top surface of the driving mechanism is fixedly connected with the bottom surface of the rotating column; a center of a bottom surface of the driving plate is fixedly connected with a rectangular column; a driving cylinder is sleeved outside the rectangular column; an inner wall of the driving cylinder is adapted to an outer wall of the rectangular column; an outer wall of a bottom of the driving cylinder is rotatably connected with a bottom surface of the chilling shell through a sealing bearing; a bottom surface of the driving cylinder is fixedly connected with an output end of a driving motor, where the driving motor is fixedly connected with the bottom surface of the chilling shell; the bottom surface of the driving plate is fixedly connected with an outer ring and an inner ring set concentrically, where a rotating ring is rotatably connected between the inner ring and the outer ring through two bearings, respectively; each side of a bottom surface of the rotating ring is fixedly connected with a lifting column; a bottom surface of the lifting column penetrates through the bottom surface of the chilling shell and is fixedly connected with an air cylinder, and the air cylinder is fixedly connected to the bottom surface of the inner cavity of the driving shell.

Optionally, the stirring mechanism includes a stirring motor, an output end of the stirring motor penetrates through a top surface of the chilling shell and is fixedly connected with a stirring shaft, and an outer wall of the stirring shaft is fixedly connected with a plurality of stirring rods.

Optionally, the thermal insulation mechanism includes a thermal insulation shell fixedly connected to an outer wall of the chilling shell, an insulation layer is fixedly connected to an inner wall of the thermal insulation shell, and a bottom surface of the thermal insulation shell is fixedly connected to a top surface of the driving shell.

Optionally, the chilling mechanism includes a compressor, where the compressor is fixedly connected to the bottom surface of the inner cavity of the driving shell, and a coil pipe is wound on the outer wall of the chilling shell, and both ends of the coil pipe, respectively, penetrate through the bottom surface of the chilling shell to communicate with the compressor.

The present application discloses the following technical effects: as compared with the existing technology, the beneficial effect of the present application is that the disadvantages of the current very-fast chilling technology on the inconsistent effect of meat tenderness are improved, and the provided new very-fast chilling method reduces the evaporative weight loss by about 1% while effectively improving the initial tenderness of beef, reducing the initial shear force value by up to 10%, saving energy and reducing emissions, and increasing production capacity; moreover, an efficient and intelligent chilling processing equipment is provided to help realize the industrial application of this technique, so as to improve beef tenderness while reducing post-slaughter evaporative weight loss, energy consumption and improving production efficiency.

BRIEF DESCRIPTION OF THE DRAWINGS

For a clearer description of the technical schemes in the embodiments or prior technology of the present application, the following figures are briefly described for use in the embodiments, and it is clear that the drawings in the following description are only for some embodiments of the present application, and that other drawings are available to those of ordinary skill in the art without creative efforts.

DETAILED DESCRIPTION OF THE EMBODIMENTS

Figure 1:
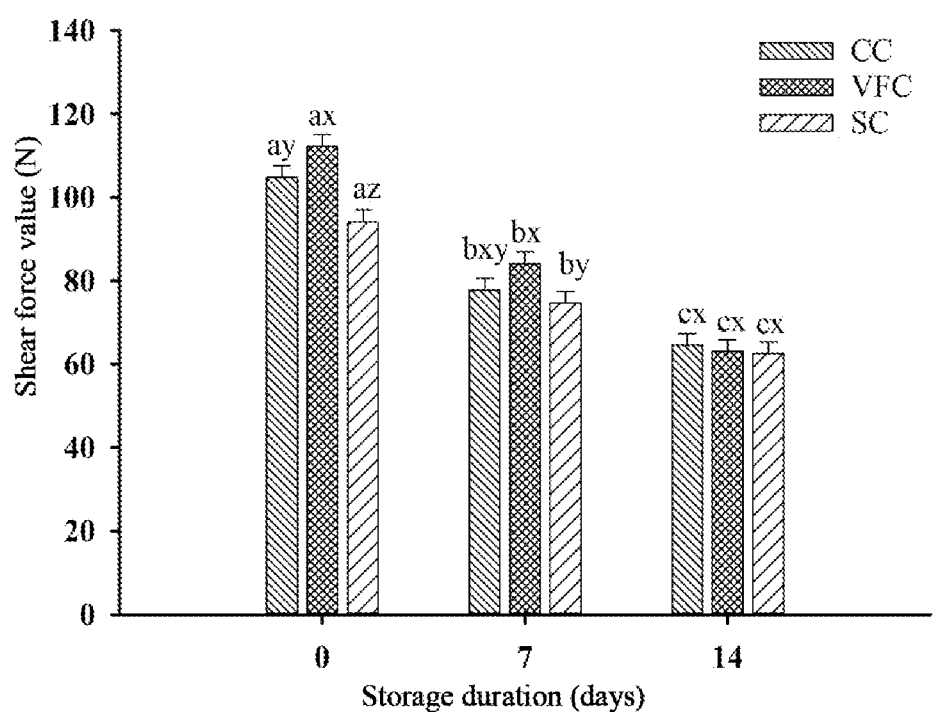
FIG. 1 shows a schematic diagram illustrating shear force values of beef longissimus dorsi muscles chilled by different chilling methods.
Figure 2:
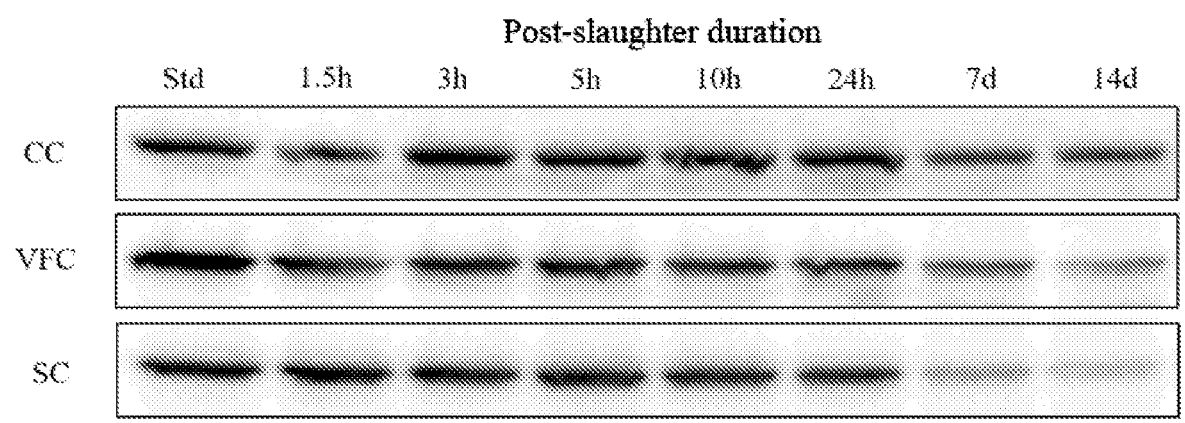
FIG. 2 is a schematic diagram illustrating degradation degrees of desmin of the beef longissimus dorsi muscles chilled by different chilling methods.
Figure 3:
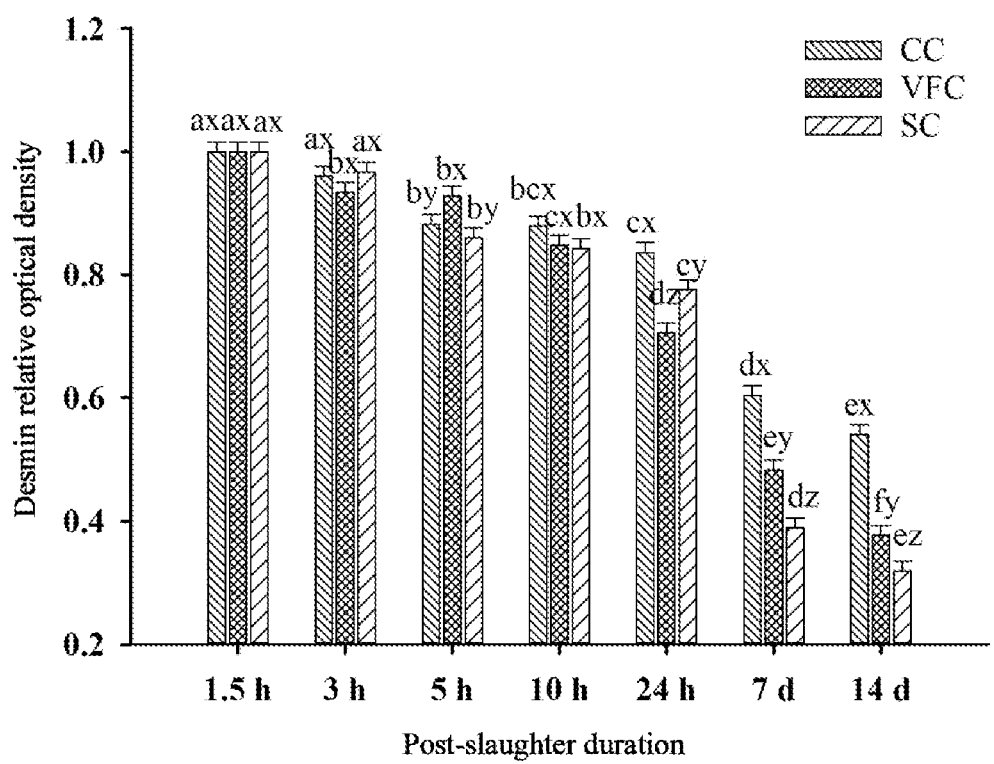
FIG. 3 shows a histogram showing the degradation degrees of desmin of the beef longissimus dorsi muscles chilled by different chilling methods.
Figure 4:
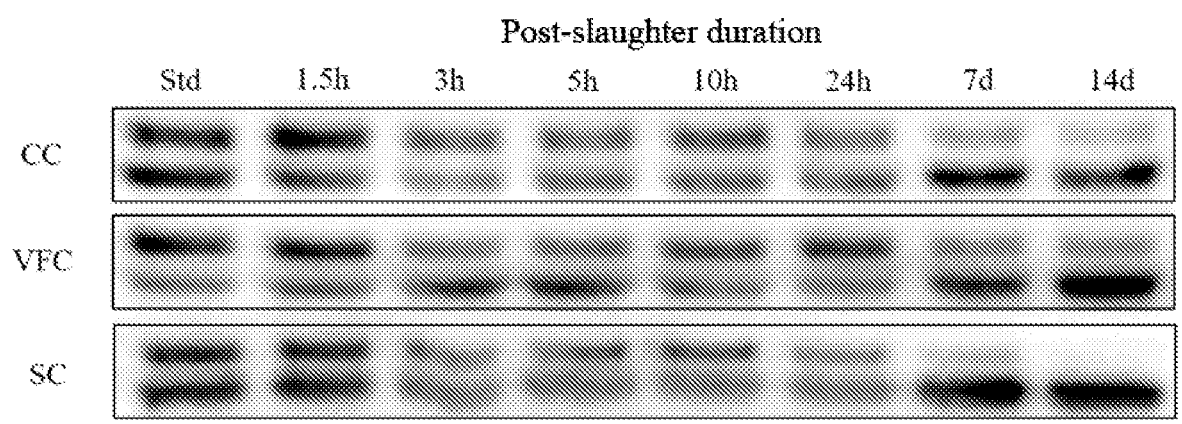
FIG. 4 is a schematic diagram of degradation degrees of troponin T in the beef longissimus dorsi muscles chilled by different chilling methods.
Figure 5:
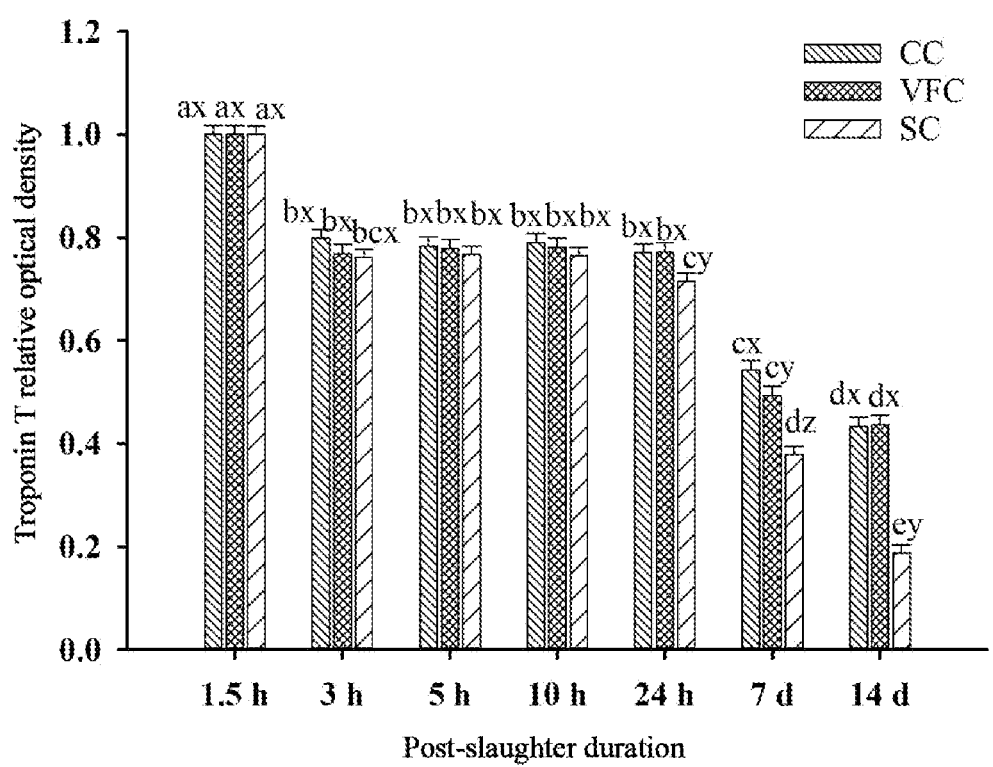
FIG. 5 is a histogram of the degradation degrees of troponin T in the beef longissimus dorsi muscles chilled by different chilling methods.

The technical schemes in the embodiments of the present application are described clearly and thoroughly below in conjunction with the accompanying drawings in the embodiments of the present application, and it is clear that the described embodiments are only a part of the embodiments of the present application, and not all of them. Based on the embodiments in the present application, all other embodiments obtained by a person of ordinary skill in the art without making creative labor fall within the protection of the present application.

To make the above-mentioned objectives, features and advantages of the present application more obvious and understandable, the following is a further detailed description of the present application in conjunction with the accompanying drawings and specific embodiments.

Referring to FIGS. 1-12, the present application provides a fast chilling method for improving beef tenderness, including steps as follows:

- step 1, sample pretreatment: taking beef longissimus dorsi muscle after slaughter, removing surface fat and connective tissue, and vacuum packaging;
- step 2, rapid chilling: rapidly transferring the pre-treated sample completed in step 1 to a chilling equipment for chilling to a sample temperature of −3 degrees Celsius (° C.), where the chilling is completed within 5 hours (h) after slaughter;
- step 3, chilling and aging at super-chilled temperature: transferring the samples rapidly chilled in step 2 to a chilled warehouse, and continuing to cool and mature until 24 h after slaughter; and
- step 4, aging: cutting the sample equally into 2.5 centimeters (cm) thickness 24 h after slaughter, and then completing a vacuum skin packaging and refrigerating for aging.

The vacuum packaging in the step 1 includes parameters of: nominal thickness of 56 micrometers (μm), oxygen permeability of 20 cubic centimeters (cc) per square meter (m$^2$) per 24 h at 1 atmosphere (atm), 23° C. and 0 percent (%) relative humidity (RH), water vapor permeability of 5 g/m$^2$/24 h at 38° C. and 90% RH, and vacuum degree of 0.1 megapascal (MPa).

The vacuum skin packaging in the step 4 includes parameters as follows:

- pallet packaging box: oxygen permeability of 10 cc/m$^2$/24 h at 1 atm and 23° C. and 0% RH, water vapor permeability of 15 g/m$^2$/24 h at 38° C. and 90% RH;
- sealing barrier film: oxygen permeability of 25 cc/m$^2$/24 h at 1 atm and 23° C. and 0% RH, water vapor permeability of 5 g/m$^2$/24 h at 38° C. and 90% RH, and vacuum degree of 0.08 MPa.

In a further optimized technical scheme, the step 1 includes a hot boning process completed within 1.5 h after slaughter, where the sample after trimming should weigh less than 4.5 kilograms (kg).

In a further optimized technical scheme, the chilled warehouse in the step 3 is set according to parameters of: ambient temperature of −1+/−1° C., humidity of 90 percent (%)-92%, and air speed of 0.5 meter (m/s).

In a further optimized technical scheme, the aging of step 4 includes parameters of: ambient temperature of 0-2° C., humidity of 90%-92%, and air speed of 0.5 m/s.

The chilling equipment includes: a chilling shell 1, where the chilling shell has propylene glycol solution 2 provided inside, a thermal insulation mechanism provided on an outer wall of the chilling shell 1, a driving shell 3 provided on a bottom surface of the chilling shell 1, a removable end cap 4 provided on a top surface of the chilling shell 1, a driving mechanism provided on a bottom surface of the chilling shell 1, a clamping mechanism provided on a top surface of the driving mechanism, a number of stirring mechanisms provided at equal intervals in a circumferential direction of the chilling shell 1, a chilling mechanism provided on a bottom surface of an inner cavity of the driving shell 3, an extension rod 5 fastened to a top surface of an inner cavity of the chilling shell 1, a temperature sensor 6 is fastened to a bottom surface of the extension rod 5, and the temperature sensor 6 is electrically connected to the chilling mechanism.

The chilling shell 1 is arranged for storing propylene glycol solution 2 and rapidly chilling beef; the thermal insulation mechanism is arranged to improve the heat preservation effect and reduce the heat loss of propylene glycol solution 2, so as to save energy and reduce the cost; the driving shell 3 is provided to store the driving mechanism and the chilling mechanism, so as to maximize the space utilization; the end cap 4 is used to seal the beef after chilling and storing, therefore the heat loss is reduced and the accuracy during chilling is improved; the clamping mechanism allows for the clamping of beef, positioning the beef in such a way that different sizes of beef have a uniform maximum circumference; before the large batch chilling process, a sample is firstly placed, and the chilling duration of the beef to a center temperature of −3° C. is calculated and recorded, and then the large batch chilling process is carried out to unify the duration, so that a standard of removing all the beef after the center temperature reaches −3° C. is achieved; moreover, the chilling mechanism regulates the temperature of propylene glycol solution 2 and maintains the temperature of propylene glycol solution 2 at −30° C. all the time, further improving the accuracy of chilling temperature; the temperature sensor 6 enables real time monitoring; the stirring mechanism is arranged to stir the propylene glycol solution 2 so as to maintain a balanced temperature; and the driving mechanism realizes the rotation and lifting of the clamping mechanism, making the sample taking and placing process more convenient and further enhancing the stirring effect.

In a further optimized technical scheme, the clamping mechanism includes a clamping plate 7, where the clamping plate 7 is provided with a plurality of through holes on a top surface, each through hole is connected to a connecting cylinder 8 on an inner wall of the through hole; a bottom surface of the connecting cylinders 8 are fixedly connected with a plurality of limiting rods 9 at equal intervals in a circumferential direction of the bottom surface, bottoms of the plurality of limiting rods 9 are fixedly connected with a bottom plate 10, where a sampling ring 11 is sleeved outside the bottom plate 10, an inner wall of the sampling ring 11 is in sliding contact with outer walls of the limiting rods 9, and an inner wall of a top of the sampling ring 11 is fixedly connected with a plurality of connecting rods 13; one end of each connecting rod 13 passes through a gap between two adjacent limiting rods 9 and is fixedly connected with a sampling plate 12; a bottom surface of the clamping plate 7 is fixedly connected with a rotating column 14, and a bottom surface of the rotating column 14 is fixedly connected with the top surface of the driving mechanism.

Before chilling the beef, the driving mechanism drives the clamping plate 7 to rise and stuffs the vacuum-packed beef into the connecting cylinder 8, so that the beef moves down to between the plurality of limiting rods 9 to realize clamping; at this time, the maximum circumference of all the different sizes of beef is the circumference of the circle surrounded by the plurality of limiting rods 9, which realizes the unification process, and the center of which is the most central position; after reaching a designated time, the driving mechanism makes it rise and moves the sampling ring 11 upward to push out the beef.

In a further optimized technical scheme, the driving mechanism includes a driving plate 15, a top surface of the driving mechanism 15 is fixedly connected with the bottom surface of the rotating column 14; a center of a bottom surface of the driving plate 15 is fixedly connected with a rectangular column 16; a driving cylinder 17 is sleeved outside the rectangular column 16; an inner wall of the driving cylinder 17 is adapted to an outer wall of the rectangular column 16; an outer wall of a bottom of the driving cylinder 17 is rotatably connected with a bottom surface of the chilling shell 1 through a sealing bearing 18; a bottom surface of the driving cylinder 17 is fixedly connected with an output end of a driving motor 19, where the driving motor 19 is fixedly connected with the bottom surface of the chilling shell 1; the bottom surface of the driving plate 15 is fixedly connected with an outer ring 20 and an inner ring 21 set concentrically, where a rotating ring 22 is rotatably connected between the inner ring 21 and the outer ring 20 through two bearings, respectively; each side of a bottom surface of the rotating ring 22 is fixedly connected with a lifting column 23; a bottom surface of the lifting column 23 penetrates through the bottom surface of the chilling shell 1 and is fixedly connected with an air cylinder 24, and the air cylinder 24 is fixedly connected to the bottom surface of the inner cavity of the driving shell 3.

The rectangular column 16 is arranged to slide relatively in the inner cavity of the driving cylinder 17 and cooperate with the lifting action of the driving plate 15. As the driving plate 15 rotates, the rotating ring 22 rotates relatively with the driving plate 15 through two bearings under the condition that the position of the rotating ring 22 is fixed, thus enhancing the stability of the driving plate 15 and meeting the lifting action of the air cylinder 24.

In a further optimized technical scheme, the stirring mechanism includes a stirring motor 25, an output end of the stirring motor 25 penetrates through a top surface of the chilling shell 1 and is fixedly connected with a stirring shaft 26, and an outer wall of the stirring shaft 26 is fixedly connected with a plurality of stirring rods 27.

In a further optimized technical scheme, the thermal insulation mechanism includes a thermal insulation shell 28 fixedly connected to an outer wall of the chilling shell 1, an insulation layer 29 is fixedly connected to an inner wall of the thermal insulation shell 28, and a bottom surface of the thermal insulation shell 28 is fixedly connected to a top surface of the driving shell 3.

In a further optimized technical scheme, the chilling mechanism includes a compressor 30, where the compressor 30 is fixedly connected to the bottom surface of the inner cavity of the driving shell 3, and a coil pipe 31 is wound on the outer wall of the chilling shell 1, and both ends of the coil pipe 31 respectively penetrate through the bottom surface of the chilling shell 1 to communicate with the compressor 31.

The temperature sensor 6 is electrically connected to the compressor 30 and enables real-time regulation of the temperature of the propylene glycol solution 2 to ensure that the temperature stays at $-30°$ C.

One embodiment of the present application includes:
Sample Collection and Processing Eighteen Simmental crossbred cattle with similar carcass weight and age are selected and approximately 30 g of meat samples are randomly removed from the left longissimus dorsi muscle from each of the six cattle at approximately 1.5 h after slaughter and quickly placed in liquid nitrogen as the sample at 1.5 h post-mortem. After that, the left carcasses of these 18 cattle are randomly divided into three groups (n=6) and chilled by different chilling methods, where the first group adopts conventional chilling, including chilling the cattle carcasses at $0-4°$ C. for 24 h; at the same time, left longissimus dorsi muscle of the remaining two groups are quickly taken off and packaged in vacuum bags after removing the surface fat, followed by chilling under the following conditions: 1) chilling with $-30°$ C. propylene glycol solution 2 (55%) to a central temperature of $0°$ C., then transferring to an environment at $-1.0°$ C. to continue the chilling, aging until 24 h after slaughter, and recording as very-fast chilling; 2) chilling with $-30°$ C. propylene glycol solution 2 (55%) to a central temperature of $-3°$ C., then transferring to an environment at $-1.0°$ C. to continue the chilling until 24 h after slaughter, and recording as new very-fast chilling; during this period, the temperature of muscle center is measured at 1.5, 3, 4, 5, 10 and 24 h respectively after slaughter, and for the indexes that are inconvenient to be measured, samples are collected at a preset time point and frozen at $-80°$ C. for further analysis. Subsequently, the sample is cut into steaks with a thickness of 2.54 cm, followed by transporting back to laboratory at $0°$ C. after vacuum skin packaging (pallet packaging box: oxygen permeability of 10 $cc/m^2/24$ h at 1 atm and $23°$ C. and 0% RH, water vapor permeability of 15 $g/m^2/24$ h at $38°$ C. and 90% RH; sealing barrier film: oxygen permeability of 25 $cc/m^2/24$ h at 1 atm, $23°$ C. and 0% RH, water vapor permeability of 5 $g/m^2/24$ h at $38°$ C. and 90% RH), then further storing at $0-2°$ C. for 14 days (d); the shear force values were measured at the $0^{th}$, $7^{th}$ and $14^{th}$ d of storage (i.e. 2, 9 and 16 d after slaughter) respectively. Statistical analysis of data: the MIXED procedure in SAS (9.2, American SAS Committee) program is used for significance analysis, with a difference significant level of $P<0.05$. Individual cattle in the model are random effects and time after slaughter, chilling method and the interaction between them are fixed effects; plots are made using Sigma Plot 10.0.

Results and Analysis

Figure 6:
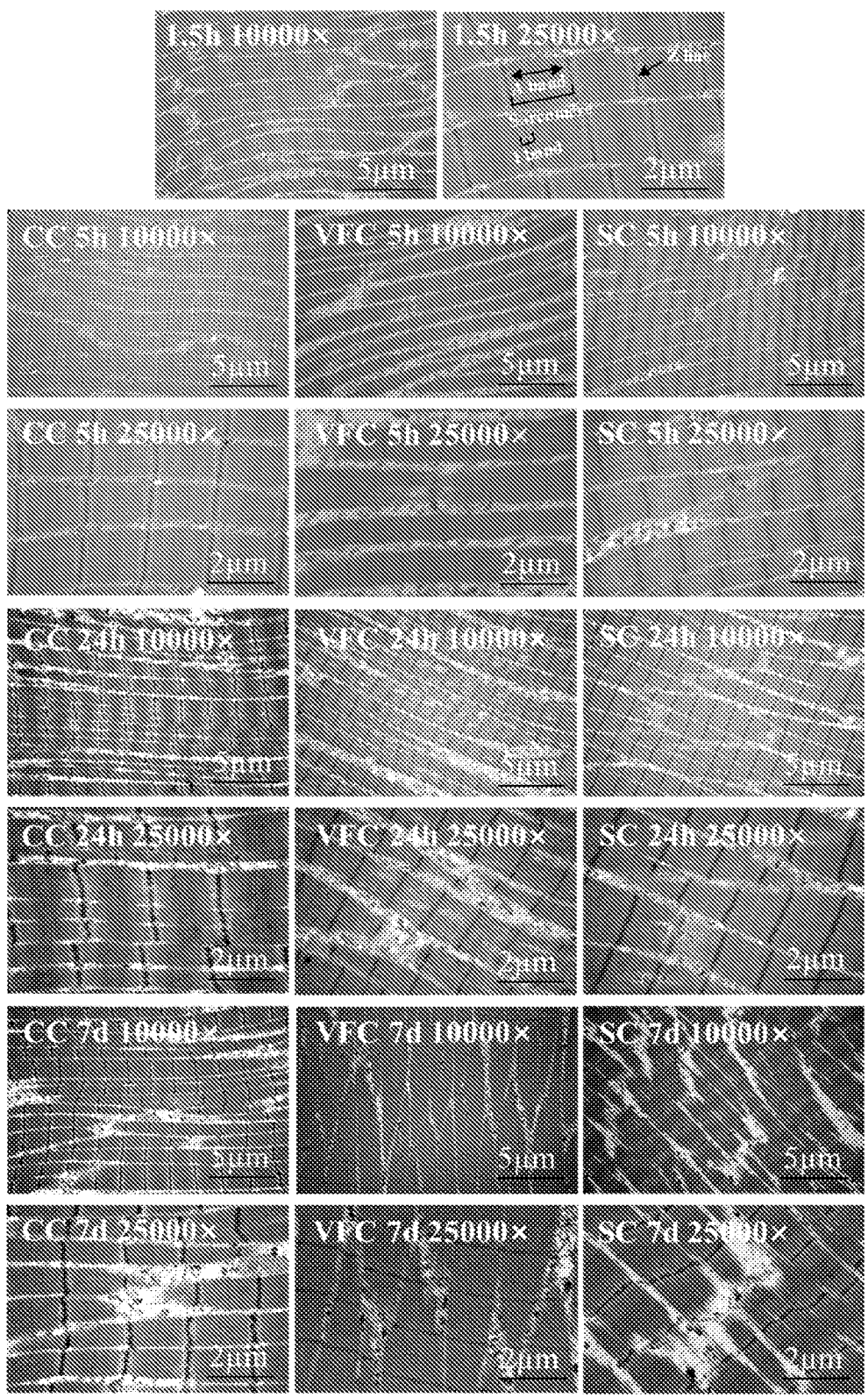
FIG. 6 shows a schematic diagram showing ultrastructural changes of myofibrils of beef samples chilled by different chilling methods.
Figure 7:
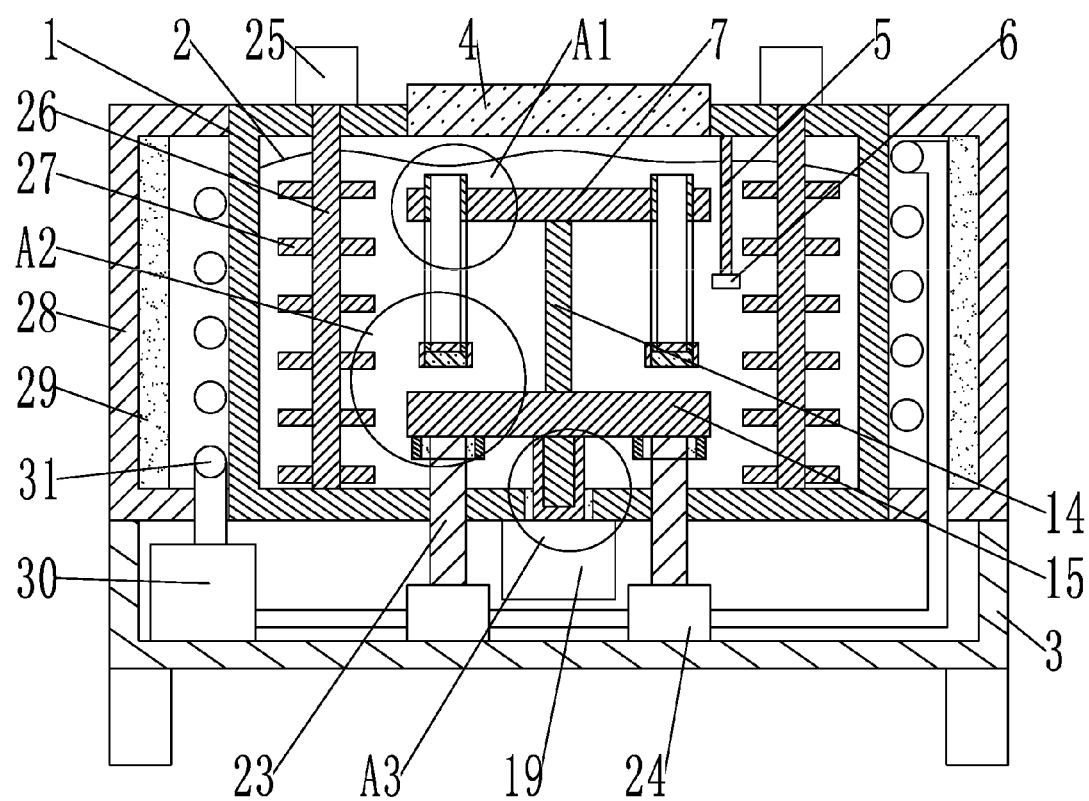
FIG. 7 illustrates a schematic structural diagram of a chilling device in the present application.
Figure 8:
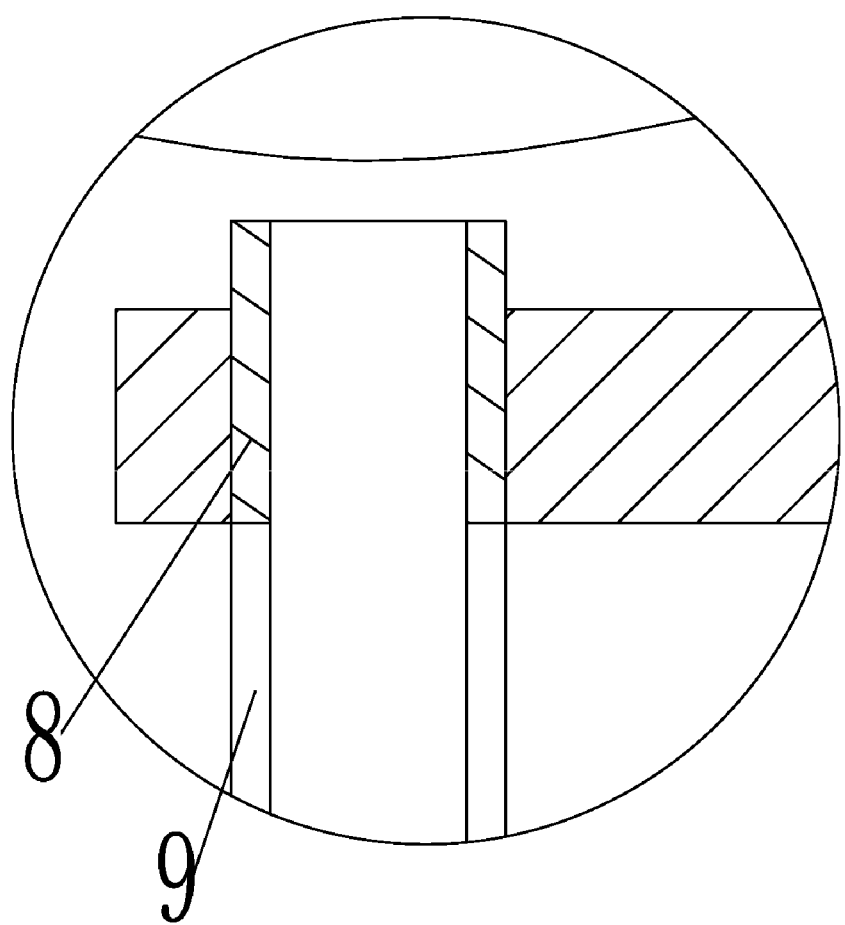
FIG. 8 is a partial enlarged view of A1 in FIG. 7.
Figure 9:
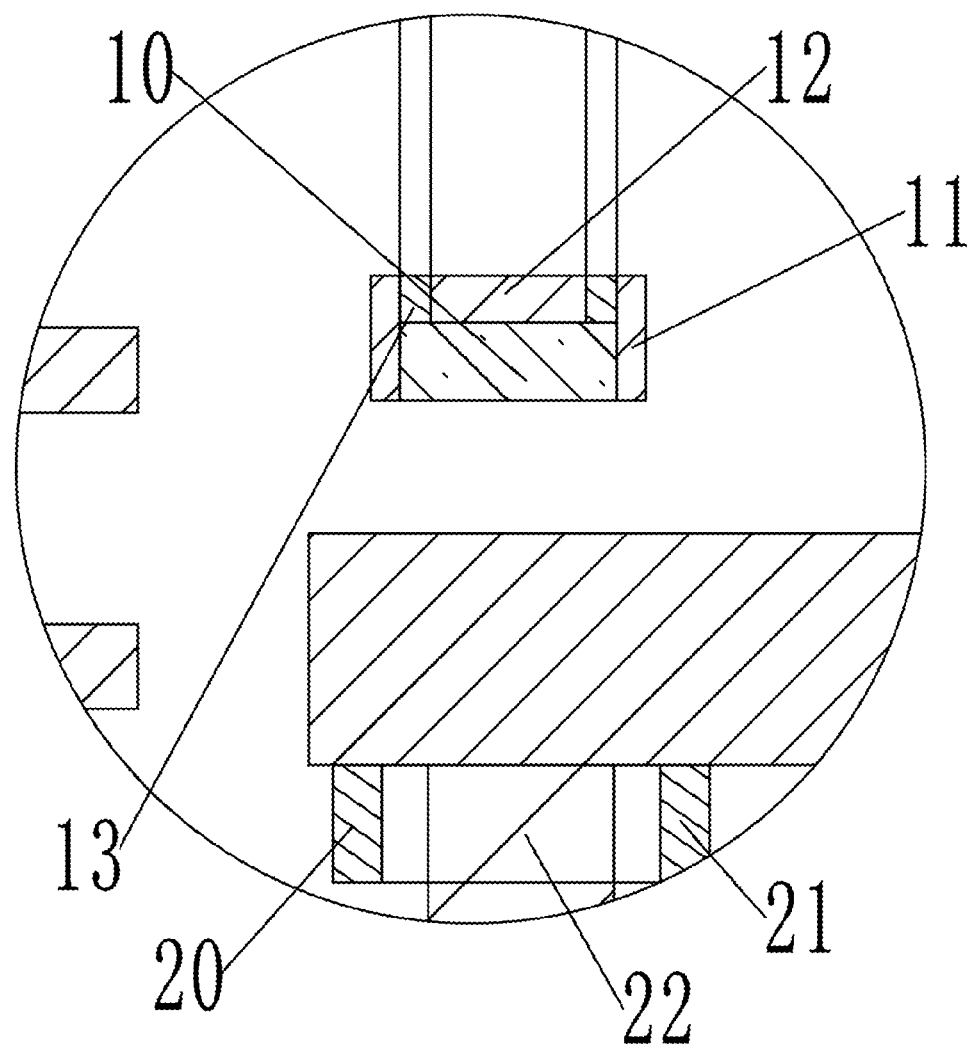
FIG. 9 is a partial enlarged view of A2 in FIG. 7.
Figure 10:
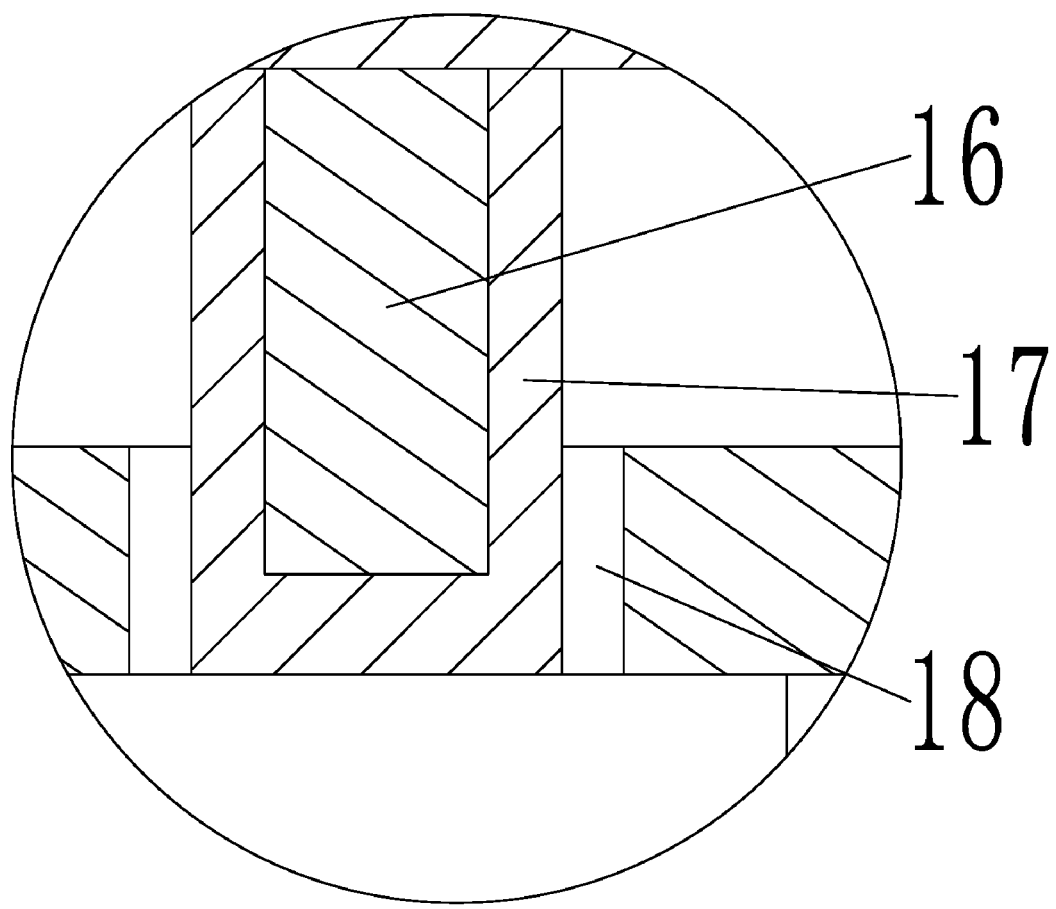
FIG. 10 is a partial enlarged view of A3 in FIG. 7.
Figure 11:
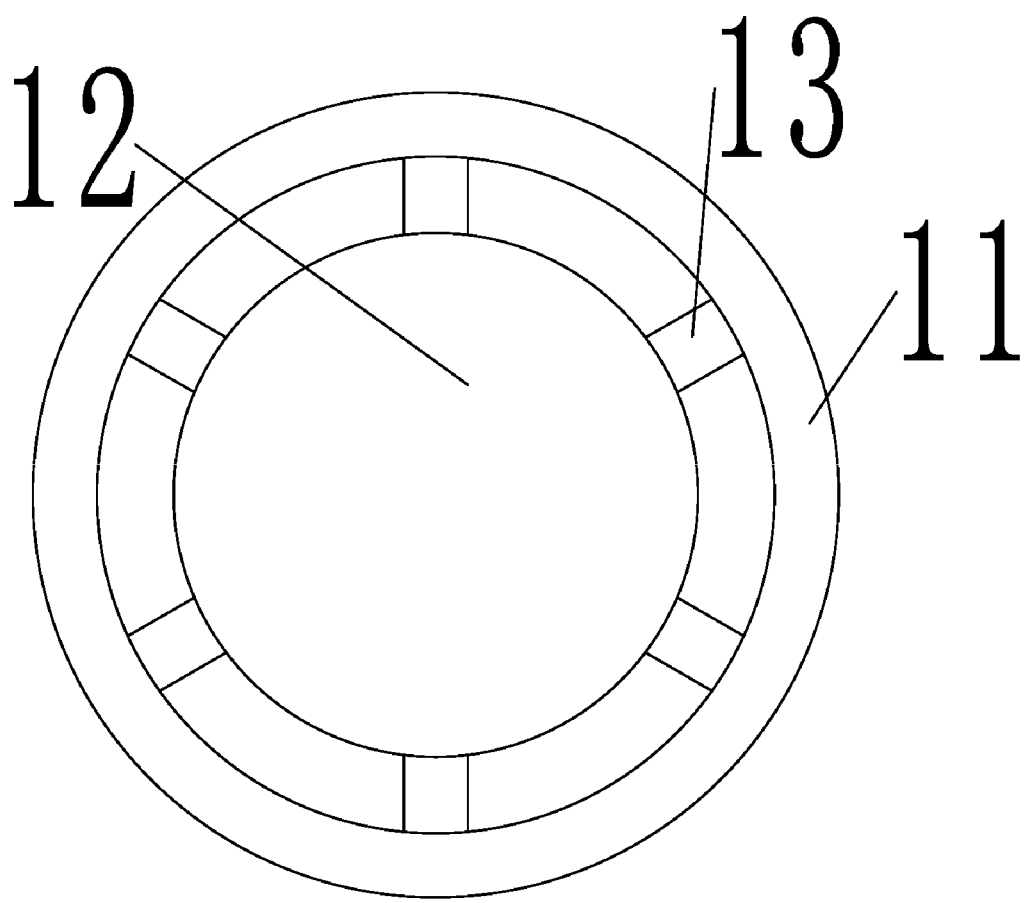
FIG. 11 is a schematic diagram of a sampling ring in the present application.
Figure 12:
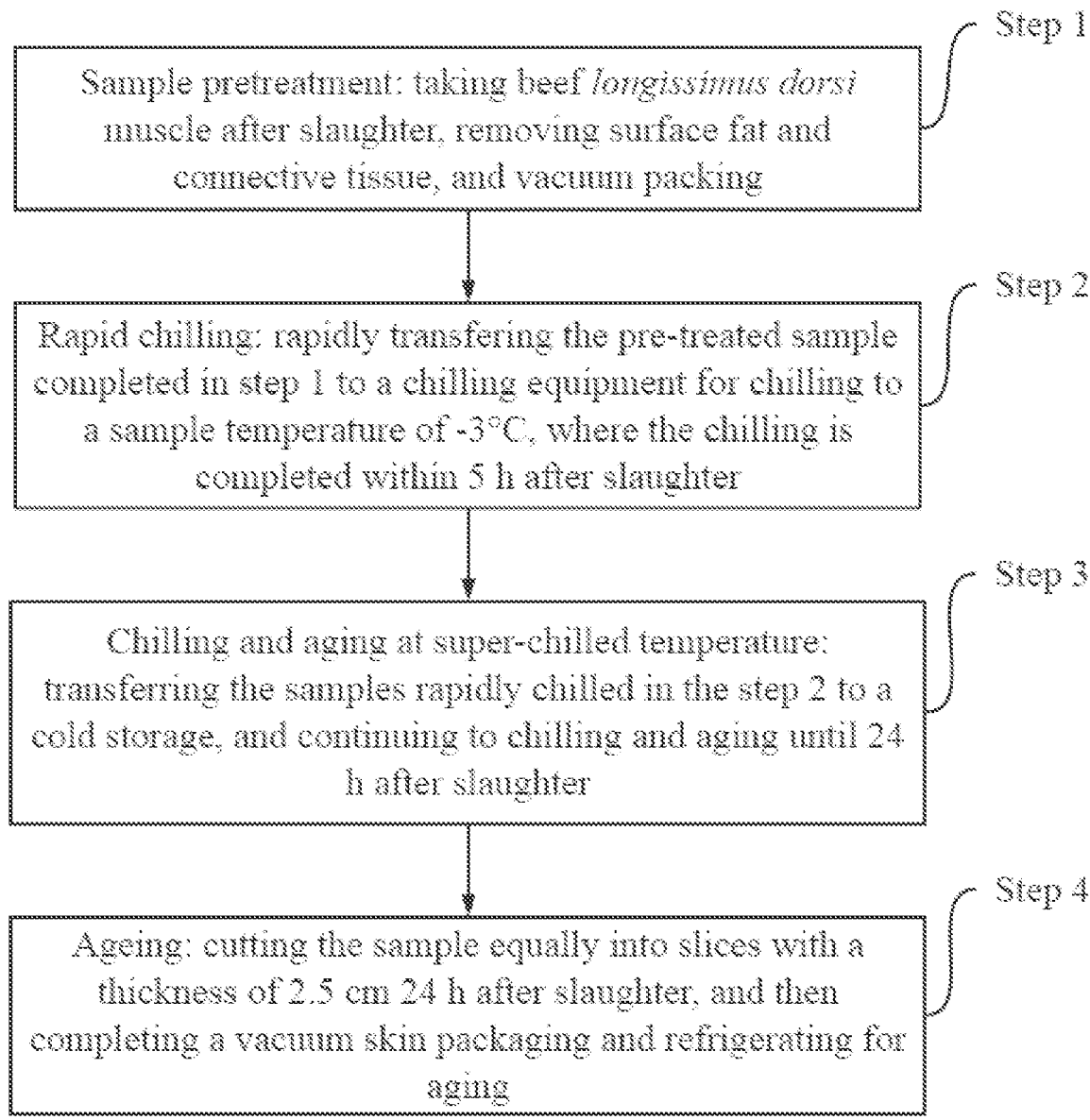
FIG. 12 is a process illustrating a fast chilling method for improving beef tenderness according to an embodiment of the present application.

In terms of tenderness, beef treated by new very-fast chilling shows a lowest shear force value ($P<0.05$) at the beginning of aging (0 d in FIG. 1), with an improvement of approximately 10% in initial tenderness compared to the conventional chilling group, this is also confirmed by results based on desmin and troponin T; the degradation degree of desmin and troponin T after 7-14 d of aging ranks the highest in the new very-fast chilling treatment group (FIG. 2, FIG. 3, FIG. 4, and FIG. 5). Besides, the results of transmission electron microscopy further reveal that the Z-line is twisted or broken due to the formation of ice crystals in the two treatment groups of very-fast chilling and new very-fast chilling at 5 h after slaughter (FIG. 6). After 7 d of aging, the sarcomere length is increased in both the very-fast chilling and new very-fast chilling groups, and the degree of myofibril destruction is significantly greater in the new very-fast chilling treatment group than that in the other two treatment groups in general. Taken together, all the results suggest that the new very-fast chilling method provides the best performance in improving beef tenderness, shortening the chilling duration and greatly improving production efficiency.

In the drawings: CC means conventional chilling, VFC means very-fast chilling, SC means new super-fast chilling, a-f indicate a significant level of difference between different time points for the same treatment group ($P<0.05$), and x-y indicate a significant level of difference between different treatment groups for the same time points ($P<0.05$).

In the description of the present application, it is to be understood that the terms "longitudinal", "transverse", "up", "down", "front", "back", "left", "right", "vertical", "horizontal", "top", "bottom", "inside", "outside", etc. indicate an orientation or positional relationship based on the orientation or positional relationship shown in the accompanying drawings and are intended only to facilitate the description of the present application and do not indicate or imply that the device or element referred to must have a particular orientation, be constructed and operate in a particular orientation and are therefore not to be construed as limiting the present application.

The above-mentioned embodiments only describe the preferred mode of the present application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A fast chilling method for improving beef tenderness, comprising steps as follows:
step 1, sample pretreatment: taking beef longissimus dorsi muscle after slaughter, removing surface fat and connective tissue, and vacuum packaging;
step 2, rapid chilling: rapidly transferring a pre-treated sample completed in the step 1 to a chilling equipment for chilling to a sample temperature of −3° C., wherein the chilling is completed within 5 h after the slaughter;
step 3, chilling and aging at super-chilled temperature: transferring the samples rapidly chilled in the step 2 to a cold storage, and continuing chilling and aging until 24 h after the slaughter; and
step 4, refrigerating and aging: cutting the sample equally into slices with a thickness of 2.5 cm 24 h after the slaughter, and then completing a vacuum skin packaging and refrigerating for aging;
wherein the chilling equipment comprises: a chilling shell, wherein the chilling shell has propylene glycol solution provided inside, a thermal insulation mechanism provided on an outer wall of the chilling shell, a driving shell provided on a bottom surface of the chilling shell, a removable end cap provided on a top surface of the chilling shell, a driving mechanism provided on the bottom surface of the chilling shell, a clamping mechanism provided on a top of the driving mechanism, a plurality of stirring mechanisms provided at equal intervals in a circumferential direction at a top of the chilling shell, a chilling mechanism provided on a bottom surface of an inner cavity of the driving shell, an extension rod is fixedly connected to a top surface of an inner cavity of the chilling shell, a temperature sensor is fixedly connected to a bottom surface of the extension rod, and the temperature sensor is electrically connected to the chilling mechanism;
the clamping mechanism comprises a clamping plate, wherein a top surface of the clamping plate is provided with a plurality of through holes, an inner wall of each of the through holes is fixedly connected with a connecting cylinder; a bottom surface of the connecting cylinder are fixedly connected with a plurality of limiting rods at equal intervals in a circumferential direction, bottoms of the plurality of limiting rods are fixedly connected with a bottom plate, a sampling ring is sleeved outside the bottom plate, an inner wall of the sampling ring is in sliding contact with outer walls of the plurality of limiting rods, and an inner wall of a top of the sampling ring is fixedly connected with a plurality of connecting rods; one end of each of the plurality of connecting rods passes through a gap between corresponding two adjacent limiting rods and is fixedly connected with a sampling plate; a bottom surface of the clamping plate is fixedly connected with a rotating column, and a bottom surface of the rotating column is fixedly connected with top surface of the driving mechanism.

2. The fast chilling method for improving beef tenderness according to claim 1, wherein a hot boning after the slaughter in the step 1 is completed within 1.5 h after the slaughter, and the sample after trimming weighs less than 4.5 kg.

3. The fast chilling method for improving beef tenderness according to claim 1, wherein parameters of the cold storage in the step 3 are: an ambient temperature of −1+/−VC, a humidity of 90%-92%, and an air speed of 0.5 m/s.

4. The fast chilling method for improving beef tenderness according to claim 1, wherein parameters of the refrigerating and aging in the step 4 are: an ambient temperature of 0-2° C., a humidity of 90%-92%, and an air speed of 0.5 m/s.

5. The fast chilling method for improving beef tenderness according to claim 1, wherein the driving mechanism comprises a driving plate, a top surface of the driving mechanism is fixedly connected with the bottom surface of the rotating column; a center of a bottom surface of the driving plate is fixedly connected with a rectangular column; a driving cylinder is sleeved outside the rectangular column; an inner wall of the driving cylinder is adapted to an outer wall of the rectangular column; an outer wall of a bottom of the driving cylinder is rotatably connected with the bottom surface of the chilling shell through a sealing bearing; a bottom surface of the driving cylinder is fixedly connected with an output end of a driving motor, and the driving motor is fixedly connected to the bottom surface of the chilling shell; the bottom surface of the driving plate is fixedly connected with an outer ring and an inner ring arranged concentrically, a rotating ring is rotatably connected between the inner ring and the outer ring through two bearings respectively; both sides of a bottom surface of the rotating ring are fixedly connected with lifting columns respectively; and a bottom surface of each of the lifting columns penetrates through the bottom surface of the chilling shell and is fixedly connected with an air cylinder, and the air cylinder is fixedly connected to the bottom surface of the inner cavity of the driving shell.

6. The fast chilling method for improving beef tenderness according to claim 1, wherein each of the plurality of stirring mechanisms comprises a stirring motor, an output end of the stirring motor penetrates through the top surface of the chilling shell and is fixedly connected with a stirring shaft, and an outer wall of the stirring shaft is fixedly connected with a plurality of stirring rods.

7. The fast chilling method for improving beef tenderness according to claim 1, wherein the thermal insulation mechanism comprises a thermal insulation shell, the thermal insulation shell is fixedly connected to the outer wall of the chilling shell, an insulation layer is fixedly connected to an inner wall of the thermal insulation shell, and a bottom surface of the thermal insulation shell is fixedly connected to a top surface of the driving shell.

8. The fast chilling method for improving beef tenderness according to claim 1, wherein the chilling mechanism comprises a compressor, the compressor is fixedly connected to the bottom surface of the inner cavity of the driving shell, a coil pipe is wound on the outer wall of the chilling shell, and both ends of the coil pipe respectively penetrate through the bottom surface of the chilling shell to communicate with the compressor.

* * * * *